July 7, 1953  V. W. MINTZ  2,644,235
DENTAL PARALLELING INSTRUMENT
Filed June 12, 1952
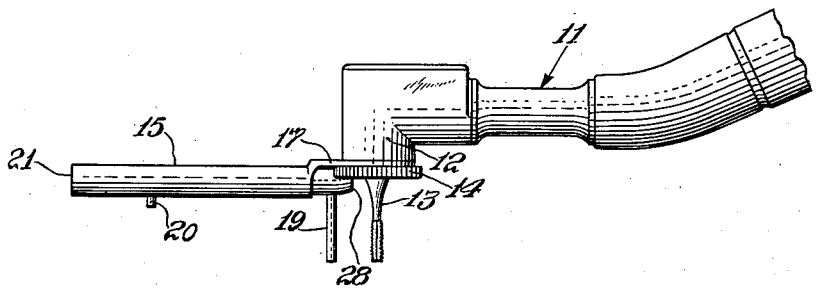
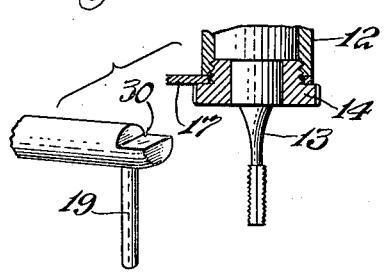
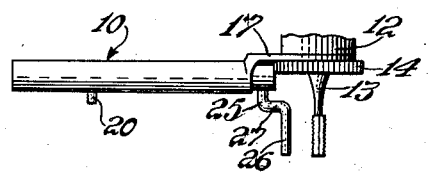
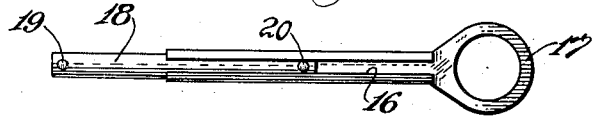
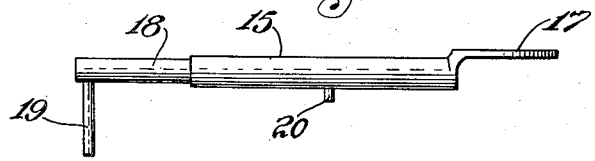
INVENTOR.
V. W. MINTZ
BY
ATTORNEY Patented July 7, 1953

2,644,235

UNITED STATES PATENT OFFICE 2,644,235

DENTAL PARALLELING INSTRUMENT

Victor W. Mintz, Maplewood, N. J., assignor to Precious Metals Research Works, Inc., New York, N. Y., a corporation of New York Application June 12, 1952, Serial No. 293,150

4 Claims. (Cl. 32—67)

This invention relates to an improved device to be used in connection with dental contra-angles, for paralleling teeth or grooves of teeth in crown and bridge work and for paralleling work in precision attachments for partial dental work. The device may be selectively secured to and removed from the conventional contra-angle in a simple and rapid manner, in certain of the forms thereof, for cooperation therewith without impeding the rotation of the burr.

Pursuant to the invention, a parallel pivot pin is slidably secured to an extension arm which is rotatably connected to the contra-angle head. The parallel pivot pin may be used for paralleling the grooves or teeth and to enable the operator to readily adjust the distance between the pivot and burr. By rotating the extension arm portion of the device, the operator may use teeth located in the portion of the jaw opposite that in which the pin is located, as a guide.

In the drawings:

Fig. 1 is a side elevational view of a dental paralleling device embodying my invention, shown secured to a dental contra-angle, the latter being shown fragmentarily, Fig. 2 is an exploded fragmentary, partly perspective, view of one form of my invention and of the lower end of a dental contra-angle to which the same may be secured, Fig. 3 is a side elevational view of another form of the invention, the dental contra-angle head being indicated fragmentarily, Fig. 4 is a bottom plan view of a dental paralleling device embodying my invention, and Fig. 5 is a side elevational view thereof.

As shown in the drawings, the device of my invention, which is generally indicated at 10, is adapted to be secured to a contra-angle generally designated at 11, the latter having a head 12 to which a projecting burr 13 is secured by a nut, such as indicated by 14 in Figs. 2 and 3. The paralleling device of the invention may be otherwise secured to dental contra-angles within the spirit and scope of the invention as set forth in the appended claims.

The burr 13 projects through the nut 14 of the contra-angle head. As shown in the drawings, the device of my invention comprises an elongated hollow tube 15 provided with a slot 16 axially coextensive therewith, an open ring 17 extending from one end of the tube. An elongated bar 18 is slidably secured in said tube, said bar being of smaller cross-section than the tube, so as to be freely axially slidable therein. The ring is so proportioned as to be adapted to be secured to the head 12 by the nut 14 and is preferably secured to the head sufficiently tightly so as to not become readily disengaged therefrom, while permitting the tube 15 to be rotated to the desired position without undue effort. A dental paralleling pin 19 is secured to the bar 18 adjacent one end 28 of the bar. A shorter stud 20 is secured to the bar intermediate the pin and the other end 21 of the bar for projection through the said slot. By the arrangement described, the pin 18 may be slidably disposed in the tube 15 and readily slid to that position therein desired for the particular application for which the device is being used.

In some cases it may be desirable to position the pin 19 substantially remote from the burr 13. In such cases the bar may be positioned within the tube 15 with the shorter stud 20 inserted first, as indicated in Figs. 4 and 5.

In the form of invention shown in Figs. 1 and 2, the bar 18 is provided with a recessed shoulder portion 30 at that end 28 of the bar to which the pin 19 is secured, so that where it is desired that the pin be extremely close to the burr 13, the bar may be moved against the contra-angle head 12, as shown in Fig. 1, with the nut end of the contra-angle head received within the shoulder portion 30, permitting close disposition of the pin 19 relative to the burr 13. For the same purpose the form of invention shown in Fig. 3 may be used, wherein the paralleling pin comprises an upper pin portion 25 secured to the bar at the end 28 thereof and a lower portion 26 of said pin connected to the upper portion 25 by a neck portion 27 so as to be offset past the end 28 of the bar. In this form of invention, when the bar is moved against the contra-angle head, as shown in Fig. 3, the offset portion 26 will be disposed past the end 28 of the bar and close to the burr 13.

For special work it may be desirable that a pin longer than that indicated at 19 and at 25—27 be provided. For that purpose, a plurality of bars corresponding with the bar 28 but having pins of different length, may be furnished with the tube 15, which will receive the bar chosen for the particular work at hand.

The foregoing description and drawings are illustrative of the essential features of the invention in practical embodiments thereof; all other forms suggested thereby coming within the scope of the appended claims are to be deemed within the scope and purview of this invention.

Having thus described my invention, what I claim as new and desire to secure by Letters Patent is:

1. A dental paralleling device for use in connection with a contra-angle having a head to which a projecting burr is secured by a nut, said paralleling device comprising an elongated hollow tube having a slot axially coextensive therewith, an open ring extending from one end of the tube, an elongated bar of smaller cross-section than the tube slidably axially disposed therein, said ring being so proportioned as to be adapted to be secured to the head by said nut, a paralleling pin secured to said bar, adjacent one end thereof, for projecting through said slot, and a shorter stud secured to said bar intermediate said pin and the other end of the bar, for projection through said slot.

2. In a dental paralleling device as set forth in claim 1, said pin comprising an upper pin portion connected to the bar at the end of the bar, and a lower end portion connected in offset relation thereto by a neck portion, so as to dispose the lower end portion past the end of the bar, close to the burr when the device is assembled on a contra-angle with the bar moved into engagement with the contra-angle.

3. In a dental paralleling device as set forth in claim 1, a recessed shoulder portion at the end of the bar to which the pin is secured, adapted to receive the nut end of the burr when the device is assembled on the contra-angle, to dispose the pin closer to the burr when the device is assembled on a contra-angle with the bar moved into engagement with the contra-angle.

4. In a dental paralleling device as set forth in claim 1, said pin comprising an upper pin portion connected to the bar at the end thereof, and a lower end portion connected thereto in offset relation by a neck portion, so as to dispose the lower end portion past the end of the bar, closer to the burr when the device is assembled on a contra-angle with the bar moved into engagement with the contra-angle.

VICTOR W. MINTZ.

References Cited in the file of this patent

UNITED STATES PATENTS

| Number | Name | Date |
|--------|------|------|
| 2,399,231 | Klein | Apr. 30, 1946 |
| 2,591,183 | Mintz | Apr. 1, 1952 |